United States Patent [19]
Steiner et al.

[11] Patent Number: 5,420,970
[45] Date of Patent: May 30, 1995

[54] METHOD FOR DETERMINING COMPUTER IMAGE GENERATION DISPLAY PIXELS OCCUPIED BY A CIRCULAR FEATURE

[75] Inventors: Walter R. Steiner; Steven V. Manno, both of Ormond Beach; Oscar G. Vela, Port Orange, all of Fla.

[73] Assignee: Martin Marietta Corporation, Bethesda, Md.

[21] Appl. No.: 192,935

[22] Filed: Feb. 7, 1994

Related U.S. Application Data

[63] Continuation of Ser. No. 669,017, Mar. 13, 1991, abandoned.

[51] Int. Cl.6 .............................. G06T 11/40
[52] U.S. Cl. .................... 395/133; 395/128; 395/142; 395/149
[58] Field of Search ............. 395/119, 126, 128–131, 395/141–143, 133–138, 149–151

[56] References Cited

U.S. PATENT DOCUMENTS

| | | | |
|---|---|---|---|
| 3,789,200 | 1/1974 | Childress et al. | 395/142 |
| 4,371,933 | 2/1983 | Bresenham et al. | 395/142 |
| 4,459,676 | 7/1984 | Oguchi | 395/142 |
| 4,835,722 | 5/1989 | Clarke et al. | 395/142 X |
| 4,962,468 | 10/1990 | Beauregard et al. | 395/143 |
| 5,146,551 | 9/1992 | Miyazawa | 395/142 |
| 5,261,033 | 11/1993 | Oka | 395/142 |
| 5,274,754 | 12/1993 | Sfarti | 395/142 |
| 5,299,302 | 3/1994 | Fiasconaro | 395/142 |

OTHER PUBLICATIONS

Foley et al. Computer Graphics Principles and Practice, (1990).

*Primary Examiner*—Almis Jankus
*Attorney, Agent, or Firm*—Geoffrey H. Krauss

[57] ABSTRACT

A method for determining whether a particular cell of an array of display cells, either of full pixels or subpixel portions, is interior or exterior to a circular feature of non-zero radius, uses a line segment length L measured from the vertical feature diameter to the feature periphery, along a point of each row of cells to be considered. For that cell row, all cells within L cells of the vertical diameter line are within the feature; the number of cells on each row changes as the row position changes with respect to the centroid.

8 Claims, 2 Drawing Sheets

METHOD FOR DETERMINING COMPUTER IMAGE GENERATION DISPLAY PIXELS OCCUPIED BY A CIRCULAR FEATURE

This application is a Continuation of application Ser. No. 07/699,017, filed Mar. 13, 1991, now abandoned.

FIELD OF THE INVENTION

The present invention relates to computer image generation (CIG) and, more specifically, to a method for determining the portion of a computer-image-generated display which is occupied by a circular feature.

BACKGROUND OF THE INVENTION

Those skilled in the computer-image-generation arts are well acquainted with the method of rendering a computer-generated image by dividing a display screen into pixels, and possibly further dividing each pixel into subpixels, before determining which of the pixels (and subpixels) lie inside each of the polygon surfaces to be shown on the display screen. The pixels/subpixels which lie inside the surface are subsequently assigned a color based upon the attributes of the surface to be displayed. Thus, those skilled in the art well know the methods for predetermination of inclusion or exclusion of a particular pixel/subpixel in a polygonal surface of the image. It is somewhat more difficult to determine which pixels/subpixels of a display screen are occupied by a portion of a feature, where a such a display circular feature is not only defined by its centroid (center position) and a color attribute, but also has a non-zero radius. While the centroid describes the X, Y, Z position of the feature center in the display environment, the radius describes the size of the feature. It is well known to transform, project and scale the centroid position to determine the I, J position (where I is the vertical-direction image screen coordinate position and J is the horizontal-direction image screen coordinate position). However, methods have hitherto been unavailable in this art for transforming the non-zero circular feature radius and for determining whether a pixel/subpixel is interior to the feature. It is therefore highly desirable to provide a method for determining the radial extent and inclusion/exclusion of a pixel/subpixel of a CIG display portion within a circular feature.

BRIEF SUMMARY OF THE INVENTION

In accordance with the invention, a method for determining whether a particular cell of an array of display cells, whether the cells are full pixels or subpixel portions, is interior or exterior to a circular point feature of non-zero radius, uses a line segment length L, measured from the vertical feature diameter to the feature periphery, along a midpoint of each row of cells to be considered. For that cell row, all cells within L cells of the vertical diameter line are within the feature; the number of cells on each row changes as the row position changes with respect to the feature centroid. A comparison of a normalized vertical distance to the feature radius yields a parameter which is input to a look-up table to determine the extent of cells to be included in each row with that vertical distance from the centroid.

In a presently preferred embodiment, provision is made for elliptical features, to calculate distorted "circular" point features.

Accordingly, it is an object of the present invention to provide a novel method for determining whether a cell, in a display of a CIG system, is within a circular feature.

This and other objects of the present invention will become apparent to those skilled in the art upon reading the following detailed description of a presently preferred embodiment of the invention, when considered in conjunction with the associated drawings.

DETAILED DESCRIPTION OF A PRESENTLY PREFERRED EMBODIMENT

Figure 1:
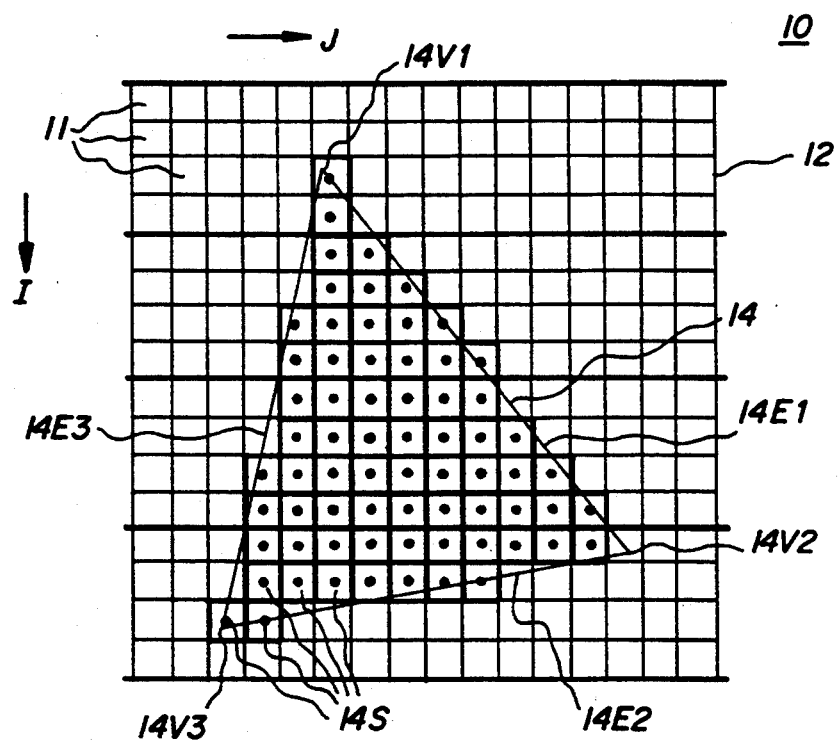
FIG. 1 is a plan view of a portion of a CIG display screen, illustrating the pixels/subpixel cells included within a surface polygon.

Referring initially to FIG. 1, a portion 10 of a CIG system display screen includes a number of cells 11 of a computer-image-generated video display. Each of the cells 11 may be a display pixel, or may be one of a number of subpixels of a display pixel, as required by the particular CIG system of which the display is a part. For purposes of illustration only, the illustrated display portion 10 may be a subspan comprised of four horizontal pixels by four vertical pixels (having boundaries shown by the heavier lines) with each pixel comprised of a 4×4 array of subpixels. It will be understood that: the number of subpixels in each pixel is purely arbitrary; there may be no subpixels in each pixel; and a 16 subpixel/pixel array (especially in a square format) is shown here only for explanational purposes. A polygon 14 (which may generally be a scalene triangle and the like) is defined by its vertices 14V1–14V3, its edges 14E1-1-4E3 therebetween, and its color attributes. It is well known to those skilled in the art to find the subpixels 14S which lie within polygon 14 and to transform, project, scale and perform the like operations upon the included subpixels (here shown with heavier outline and a subpixel center dot). Typically, the included subpixels 14S may have an image screen coordinated position defined by a first parameter I in the vertical screen direction and by a second parameter J in the horizontal screen direction. For example, the image-generating computer may be used to determine whether more than 50 percent of the area of each subpixel is occupied by a portion of the polygon 14, for inclusion of that subpixel within polygon 14. This procedure typically requires a relatively lengthy series of calculations, based upon the vertices of each edge of the polygon.

Figure 2:
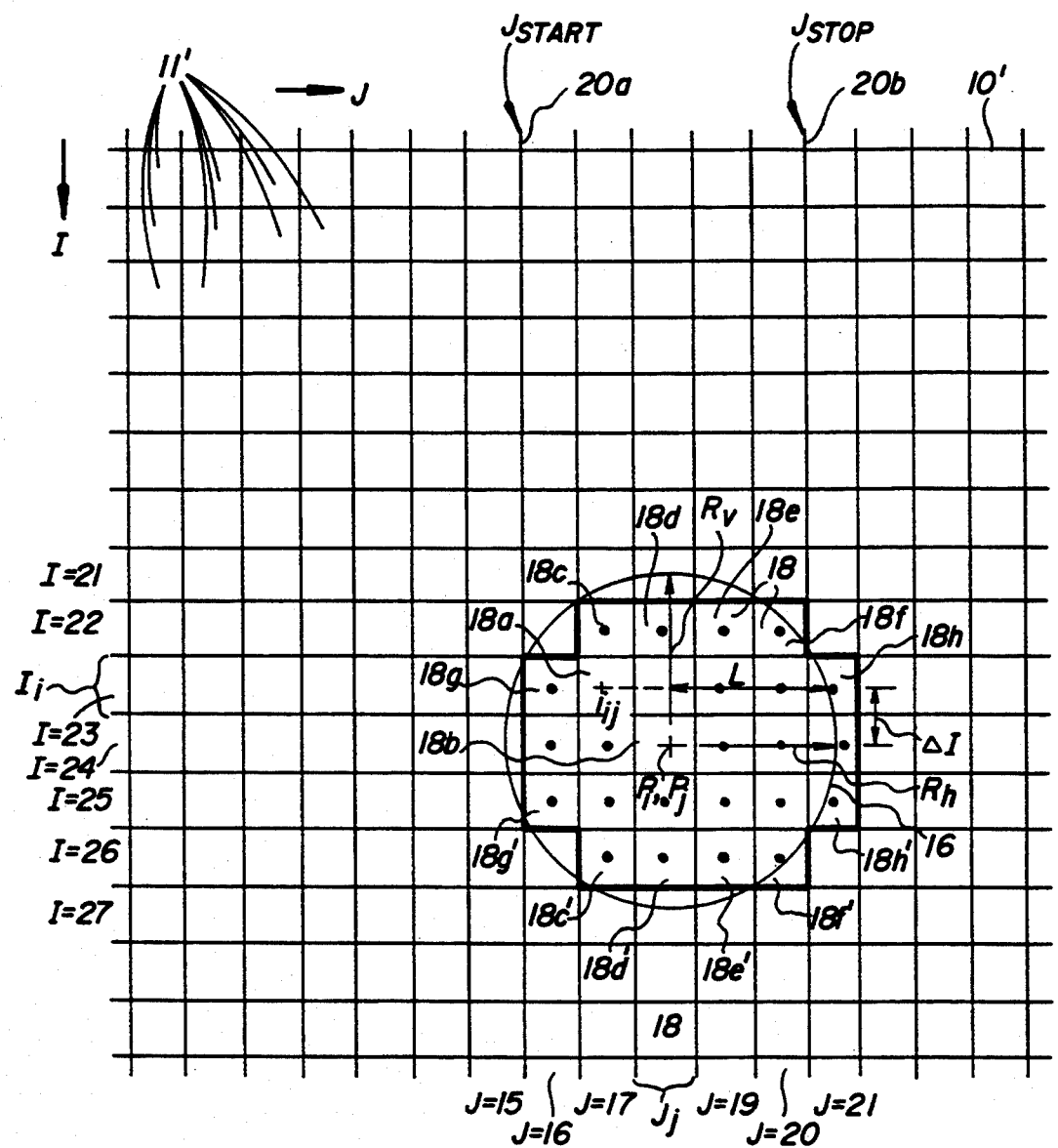
FIG. 2 is a plan view of a portion of a CIG display screen, illustrating the pixels/subpixels cells included within a circular feature, in accordance with the principles of the present invention.

Referring now to FIG. 2, in accordance with one aspect of the present invention, a circular surface feature 16, placed upon a display screen portion 10' (comprised of pixels, which may be each further comprised of subpixels, as above), is defined by a center position, or centroid, P which describes the X, Y, Z position of the feature center in the screen environment, and thus may be defined by a first quantity $P_i$ which defines the feature center in the I vertical screen direction, and by a second quantity $P_j$ which defines the feature center in the J horizontal screen direction, both as located with respect to a central screen point (not shown) at which $P_i=0=P_j$, the feature 16 is also defined by a non-zero-length radius R describing the size of feature 16, and at least one color attribute. As with the positions of the polygon vertices 14V1-14V3 of FIG. 1, the centroid position P can be transformed, projected and scaled to determine the I, J positions thereof on an image screen; the feature radius R has hitherto been accommodated in one of two ways: either a substantially zero radius ("true point") has been assumed, or an actual radius has been carried through all transformations and the resulting non-zero-sized feature has remained a circular feature under all transformations.

In accordance with another feature of the present invention, all of the pixels/subpixel cells 11' about the centroid of a circular feature are tested to determine whether each pixel/subpixel cell is interior or exterior to the feature, in the image plane in which the feature is circular; once a pixel/subpixel cell is determined to be a cell 18 interior to the feature (i.e. to be an includable cell lying on a cell line), that pixel/subpixel cell is so marked and remains interior to the feature even while the feature undergoes transformation, projection, scaling and the like operations, so that the final feature includes all the necessary pixels/subpixel cells, even if the final image shape is distorted (e.g. into a line, ellipse and the like) from a true circle. Thus, each pixel/subpixel cell is processed and tested to determine whether that pixel/subpixel cell is interior to the feature surface and if so, color and Z distance of the circular feature is assigned to the pixel/subpixel cell. Subsequently, if other surfaces lie on that cell, a depth buffer operation, itself well known to those skilled in the art, can be performed to find the closest, and therefore, visible, surface on the pixel/subpixel; the depth buffer operation and theory is of no concern in the present invention, and is specifically excluded therefrom.

In order to allow for subsequent ellipticity of the feature, after transformation and the like operations, the common circular radius R is first transformed into a vertical radius $R_v$ which is maintained separate from the horizontal radius $R_h$. The two radii are initially equal, $R_h=R_v$, as the feature 16 starts out as a circular feature, but can change to an ellipse as the display is operated upon. Each of the vertical and horizontal radii is now expressed in terms of the number of pixels/subpixel cells 11' traversed thereby, by the following procedure: a pixelized radius $R_p$ is found by taking the quotient of the feature radius R and the Z component of the feature centroid, i.e. $R_p=R/z$. The vertical radius $R_v=S_i*R_p$, where $S_i$ is the I direction scaling factor, $S_i=I_{max}/(-2\tan(\Phi/2))$, where $I_{max}$ is the number of pixels I vertical direction and $\Phi$ is the vertical field-of-view half angle. Similarly, the horizontal radius $R_h=S_j*R_p$, where $S_j$ is the J direction scaling factor, $S_j=J_{max}/(2\tan(\Theta/2))$, where $J_{max}$ is the number of pixels in the J horizontal direction and $\Theta$ is the horizontal field-of-view half angle. The projected centroid positions $P_i$ and $P_j$ are now known, as are the horizontal and vertical radii $R_h$ and $R_v$, so that the pixel/subpixels 18 which lie within the circular feature boundary can be found by testing the point to determine whether the pixel/subpixel is interior to the feature or not.

The feature 16 lies on the image screen portion 10' and covers a multiplicity of cells 11' (pixels or subpixels, dependent upon the particular CIG system in use). For purpose of illustration, we assume that each cell 11' is a subpixel, with a square array of S×S subpixels forming a single pixel, and with a multiplicity of pixels being arrayed to form at least the screen portion 10'. Consider any subpixel 18, such as the pixel 18a having a center at a position (i, j). In general, this pixel 18a is not the pixel in which the feature 16 centroid $P_i$, $P_j$ lies, and so must be tested for inclusion or exclusion in the feature (the sub-pixel 18b in which centroid $P_i$, $P_j$ lies is the only cell which is automatically included in the feature). A presently preferred method of testing commences by first finding a $\Delta I$ where $\Delta I=|i-P_i|$, and is the screen vertical direction offset distance. The length of a line segment L from the vertical diameter of the feature 16 to the point feature edge, at a vertical offset distance $\Delta I$ between the middle of the row and the feature centroid, is $$L=R_h(1-(\Delta I/R_v)^2)^{\frac{1}{2}}$$

which is derivable from the equation of an ellipse. Once the length of line segment L is found, a start $J_{start}$ line 20a and a stop $J_{stop}$ line 20b can be found in the horizontal direction as $$J_{start}=P_j-L$$

and $$J_{stop}=P_j+L.$$

For each row $I_i$ of pixels, for i from $P_i-R_v$ through $P_i+R_v$, each of the subpixel column designators j can be compared to $J_{start}$ and $J_{stop}$, and the subpixel will be inside the desired feature if $$J_{start} \leq j \leq J_{stop}.$$

This condition is tested for by suitable means, and an output is enabled if the cell is includable in the feature.

Figure 3:
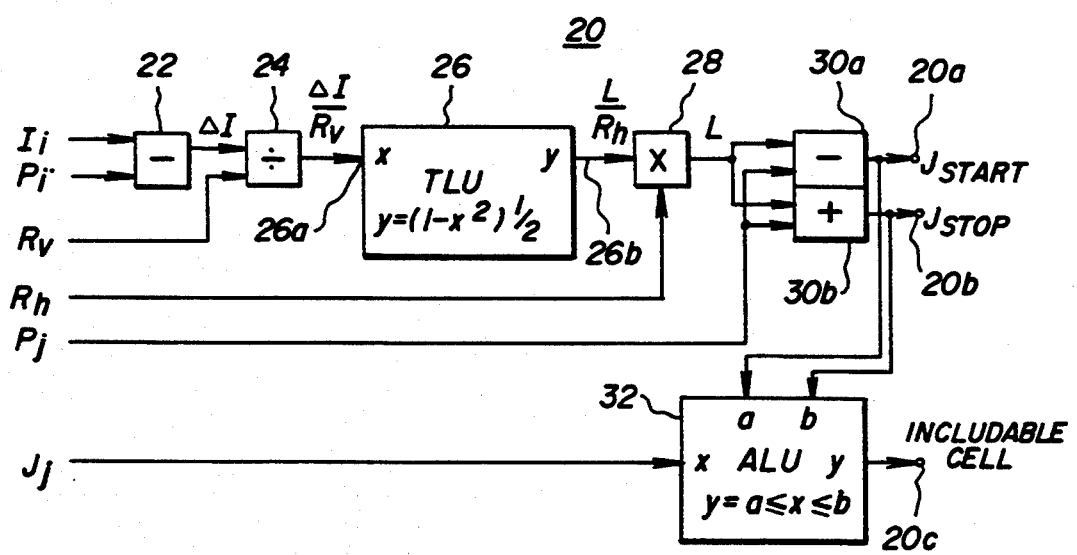
FIG. 3 is a schematic block diagram of a portion of apparatus for determining whether a pixel/subpixel cell is exterior or interior to a circular surface.

These calculations can be carried out by a properly programmed general purpose computational means, such as a microprocessor and the like, or by dedicated hardware, such as the apparatus 20 shown in FIG. 3 and further explained, by way of example only, for rows I=21 through I=27 and columns J=15 through J=21 of the display portion in FIG. 2. For each of the rows $I_i$ (where the maximum and minimum values, and the sequential-stepping through the subsequent range thereof, is determined by computational means not shown, in manner well known to the art), the difference between $I_i$ and the vertical centroid position $P_i$ is taken in a differencing means 22, to derive the absolute vertical offset $\Delta I$. For example, if feature 16 has a centroid $P_i=24$ and $P_j=18$, with R=3, then the first row to be considered has $I_i=(P_i-R)=21$ and the last row is $I_i=(P_i+R)=27$. Initially, $\Delta I=3$ (for row I=21). The feature vertical radius $R_v$ data (e.g. here $R_v=R$) is input along with $\Delta I$ data, into a divisor means 24, to obtain the quantity $(\Delta I/R_v)$ data, here now equal to 1. The data for $(\Delta I/R_v)$ is provided to the x input 26a of a means 26 for providing an output $y=(1-x^2)^{\frac{1}{2}}$ at a data output 26b. Means 26 can be a square-root-providing means utilizing a table look-up (TLU) in which the square root of the quantity in parentheses is found by table look-up operations, in matter well known to the computational arts. The y quantity data at output 26b is the data of quantity $(L/R_h)$ and is multiplied, in a multiplier means 28, by the horizontal radius $R_h$ (here, $R_h=R=3$) of the feature feature, to obtain the line segment length L. Thus, for row I=21, the line segment L length is zero (the extent of point 16 at the center of row 21). There would be no further computation with L≦0. The next row $I_i=22$ data is now processed; ΔI is now equal to 2 and L is found to be about 2.24 subpixels long. The L data, for the present row, is simultaneously input to a first input of a subtractor means 30a and a first input of an addition means 30b. The remaining inputs of both means 30a and 30b receive the centroid column data $P_j$, so that the respective means 30a and 30b can provide the column start and stop data $J_{start}$ and $J_{stop}$, respectively. For row I=22, $J_{start}$ is computed to be (18−2.24)≈(15.76) and is rounded off to $J_{start}=16$; $J_{stop}$ is computed as (18+2.24)=20.24 and is rounded off to $J_{stop}=20$. An arithmetic logic unit 42a compares the $J_i$ column value with the start/stop values, and enables output 20c if the cell is within the feature. Thus, for (along the midrow of) $I_i=22$, all subpixels 18c-18f between J=16 and J=20 are included in the feature. It will be understood that, if there is vertical symmetry of a circular feature, the same beginning column $J_{start}$ and ending column $J_{stop}$ obtain in the $I_i=P_i+\Delta I$ row (e.g. the $I_i=26$th row includes the subpixels 18c'-18 f' between J=16 and J=20). Having obtained the included subpixels in a row, the controlling circuitry introduces the next sequential row number (e.g. $I_i=23$) into means 22, and uses the new $J_{start}$ (=15) and $J_{stop}$ (=21) data (also provided at outputs 20a/20b) to find the cells (subpixels 18g, through 18h) includable in that row (and, if symmetry is used, the subpixels 18g' through 18h' in the $I_i+P_i+\Delta I$, here $I_i=25$, row). All rows are sequentially checked and a list is kept of includable cells, for subsequent use, as needed.

While one presently preferred embodiment is shown of our novel method for determining which cells of a display cell array are includable in a circular feature, many modifications and variations will now occur to those skilled in the art. It is our intent to be limited only by the scope of the appending claims, and not by the specific details and instrumentalities described for the exemplary embodiment set forth hereinabove.

What is claimed is:

1. A method for illuminating pixels of at least a portion of a scene raster, displayable by a computerized image generator, as part of a plurality of raster line cells covered by a circular feature to be displayed, comprising the steps of:
    (a) providing data storage means and data processing means in the computerized image generator;
    (b) providing, to the processing means from the storage means, a set of electronic data signals specifying both a centroid location P and a radius length R of the circular feature;
    (c) causing the processing means to determine, using a first radial component of the feature in a direction substantially perpendicular to a common scan direction of the raster, a maximum line range to include those raster lines encompassing the feature to opposite sides of the feature centroid in the direction of the first radial component, and within a maximum distance set by the feature radius;
    (d) for each line of raster cells within the determined range, then generating within the processing means another electronic data signal determining a length of a segment of each of the plurality of raster cell lines, with each segment extending from a feature radial line to an edge of the feature in that cell line, along which lie cells which will be present in the scene to be displayed, by the substeps of: generating, from the feature centroid data signal, for each identified cell line, an electronic data signal specifying an offset distance ΔI from that cell line to a cell line including the feature centroid; generating a line segment distance L data signal dependent upon the offset distance data signal; and utilizing the data signals to determine specification data signals specifying start and stop parameters of the data signals specifying the range of sells along each identified cell line segment;
    (e) generating raster line segment length output data signals using pixel information obtained responsive to the electronic data signals for all cells determined in step (c);
    (f) causing the processor means to generate display scene data signals using in part the line segment data signals obtained in step (d); and
    (g) displaying each display scene responsive to the generated display video data signals.

2. The method of claim 1, wherein the line segment distance L data signal is generated from $L=R_h(1-(\Delta I/R_v)^2)^{1/2}$, is a first radius data signal and $R_h$ is a data signal for another radius in a direction substantially perpendicular to the first radius.

3. The method of claim 2, wherein the cell lines are the rows of a cell array, and the start and stop parameters are columns of that array.

4. The method of claim 3, wherein the start column is L columns prior to the array column in which the centroid is located.

5. The method of claim 4, wherein the stop column is L columns after to the array column in which the centroid is located.

6. The method of claim 3, wherein the data signals for all cells with a column number between the start and stop column numbers for that cell row, are included in the feature data signal set used in step (e).

7. The method of claim 6, further including the step of storing a list set of the data signals for all cells included in any visible circular feature.

8. The method of claim 7, further including the step of storing the list of included cells by row number.

* * * * *